US008391155B2

(12) United States Patent
Harb

(10) Patent No.: US 8,391,155 B2
(45) Date of Patent: Mar. 5, 2013

(54) DIGITAL CONTENT DOWNLOAD ASSOCIATED WITH CORRESPONDING RADIO BROADCAST ITEMS

(76) Inventor: Joseph Harb, Woodinville, WA (US)

( * ) Notice: Subject to any disclaimer, the term of this patent is extended or adjusted under 35 U.S.C. 154(b) by 936 days.

(21) Appl. No.: 12/049,231

(22) Filed: Mar. 14, 2008

(65) Prior Publication Data

US 2008/0214236 A1 Sep. 4, 2008

Related U.S. Application Data

(63) Continuation of application No. 11/935,364, filed on Nov. 5, 2007, which is a continuation-in-part of application No. 11/850,627, filed on Sep. 5, 2007.

(60) Provisional application No. 60/865,585, filed on Nov. 13, 2006.

(51) Int. Cl.
*H04L 12/16* (2006.01)
*H04L 12/66* (2006.01)
*H04L 12/28* (2006.01)
*H04J 3/24* (2006.01)

(52) U.S. Cl. ......... 370/238; 370/356; 370/401; 370/475

(58) Field of Classification Search ............... 455/556.1, 455/556.2, 3.06, 558, 567, 414.1, 418, 419, 455/412.1, 412.2; 370/238, 401, 352, 356, 370/475
See application file for complete search history.

(56) References Cited

U.S. PATENT DOCUMENTS

| 5,898,910 A | 4/1999 | Miyake |
| 6,252,367 B1 | 6/2001 | Sakamoto et al. |
| 6,481,628 B2 | 11/2002 | Lion et al. |
| 6,623,136 B1 | 9/2003 | Kuo |
| 6,650,534 B2 | 11/2003 | Tree |
| 6,845,360 B2 | 1/2005 | Jensen et al. |
| 6,915,176 B2 | 7/2005 | Novelli et al. |
| 7,062,528 B2 | 6/2006 | Deguchi |
| 7,107,234 B2 | 9/2006 | Deguchi |
| 7,127,454 B2 | 10/2006 | Deguchi |
| 7,158,943 B2 | 1/2007 | van der Riet |
| 7,190,971 B1 | 3/2007 | Kawamoto |
| 7,302,243 B2 | 11/2007 | Tarbouriech |
| 7,908,172 B2 | 3/2011 | Corts |
| 2001/0055391 A1 | 12/2001 | Jacobs |
| 2002/0049037 A1* | 4/2002 | Christensen et al. ........ 455/3.06 |

(Continued)

FOREIGN PATENT DOCUMENTS

WO WO2007092463 8/2007

OTHER PUBLICATIONS

Olsen, Stefanie, Will consumers warm up to CATs?, CNET News. Http://news.cnet.com/Will-consumers-warm-up-to-CATs/2100-1017_3-244055.html, Aug. 3, 2000.

(Continued)

*Primary Examiner* — Melanie Jagannathan
(74) *Attorney, Agent, or Firm* — Stolowitz Ford Cowger LLP

(57) ABSTRACT

A portable device is used to capture, in real time, data sufficient to identify an item, such as a product or service promoted, or a music track played, on a broadcast medium such as radio or television. The capture device can be a standalone implementation, or an application program executable on a personal communication device such as a cell phone or Blackberry. The capture device communicates the captured data to a remote server via a selected wired or wireless channel, or the internet, and the server provides services to support the user in responding to the radio or television broadcast item that corresponds to the captured data. The server on demand downloads to the user additional digital content associated with the identified radio broadcast item.

13 Claims, 8 Drawing Sheets

U.S. PATENT DOCUMENTS

| | | |
|---|---|---|
| 2002/0082901 A1 | 6/2002 | Dunning et al. |
| 2003/0097338 A1 | 5/2003 | Mankovich |
| 2004/0034560 A1 | 2/2004 | Mathis |
| 2004/0210943 A1 | 10/2004 | Philyaw |
| 2004/0214525 A1 | 10/2004 | Ahn |
| 2005/0060350 A1 | 3/2005 | Baum et al. |
| 2005/0154599 A1 | 7/2005 | Kopra et al. |
| 2005/0216855 A1 | 9/2005 | Kopra et al. |
| 2006/0074808 A1 | 4/2006 | Boesen |
| 2006/0141962 A1 | 6/2006 | Forbes |
| 2006/0143016 A1 | 6/2006 | Jones |
| 2006/0253874 A1 | 11/2006 | Stark et al. |
| 2006/0265731 A1 | 11/2006 | Matsuda |
| 2007/0043829 A1 | 2/2007 | Dua |
| 2007/0061215 A1 | 3/2007 | Waites |
| 2007/0100766 A1 | 5/2007 | Healy et al. |
| 2007/0143778 A1 | 6/2007 | Covell et al. |
| 2007/0149114 A1 | 6/2007 | Danilenko |
| 2007/0232223 A1 | 10/2007 | Bilange |
| 2007/0239895 A1 | 10/2007 | Alperin et al. |
| 2007/0244750 A1 | 10/2007 | Grannan et al. |
| 2007/0265979 A1 | 11/2007 | Hangartner |
| 2007/0281606 A1* | 12/2007 | Baunach .................. 455/3.06 |
| 2007/0294096 A1 | 12/2007 | Randall |
| 2008/0114480 A1 | 5/2008 | Harb |
| 2008/0114664 A1 | 5/2008 | Harb |
| 2008/0147487 A1 | 6/2008 | Hirshberg |
| 2008/0249886 A1 | 10/2008 | Woodard |
| 2008/0318529 A1 | 12/2008 | Harb |
| 2010/0161420 A1 | 6/2010 | Mandel |

OTHER PUBLICATIONS

Vranica, Suzanne "NBC's Olympic Test: Counting All the Games' Viewers," Wall Street Journal, Jul. 7, 2008.

Beaumont, Claudine, "Google G1 Phone Will Teach Users How to Play the Guitar and Make the Perfect Martini," Telegraph.co.uk, Date Oct. 24, 2008.

International Searching Authority USPTO; International Search Report and Written Opinion; Jan. 8, 2009; 11 pages.

PR Newswire: "Alchemdeia and Digimarc Form Strategic Partnership to Manage Online Content," Oct. 23, 2000, Proquest #62834302, 4 pages.

Digimarc Corporation Website: Internet Archive Wayback Machine, www.archive.org, May 2001, 3 pages.

Stolowitz Ford Cowger LLP, Listing of Related Cases, Jan. 25, 2012.

Stolowitz Ford Cowger LLP List of Related Matters dated Dec. 23, 2011.

* cited by examiner

What's in my Quu?

This is where description text goes this is for placement this is just for placement only this is just for Step 1 Select Theme ▶ Step 2 Review & Purchase

Music  600

DOWNLOAD [iTunes ▼]   BUY CD

| Song Title | SONG | ALBUM | ALBUM Ship to... | Radio Station | State | City | Date & Time |
|---|---|---|---|---|---|---|---|
| I Still Haven't found... | ✓ | ✓ | ✓ | 103.7 KMTT | WA ▼ | Seattle ▼ | 05/04/07 6:15 AM |
| With Or With Out You | ✓ | ✓ | ✓ [Ship to...] | 103.7 KMTT | WA ▼ | Seattle ▼ | 05/04/07 7:45 AM |
| Get Me Outta Here | ✓ | ✓ | ✓ | 98.5 KDRK | OR ▼ | Bend ▼ | 05/04/07 9:02 AM |
| One Tree Hill | ✓ | ✓ | ✓ | 105.2 ROCR | OR ▼ | Bend ▼ | 05/03/07 5:05 PM |
| But I Might Die Tonight | ✓ | ✓ | ✓ | 89.5 KDMT | OR ▼ | Portland ▼ | 05/01/07 5:15 PM |
| Elvis Costello | ✓ | ✓ | ✓ | 89.5 KDMT | OR ▼ | Portland ▼ | 04/28/07 2:15 PM |
| Forty Licks | ✓ | ✓ | ✓ | 89.5 KDMT | OR ▼ | Portland ▼ | 04/25/07 1:25 PM |

Transcripts  630

DOWNLOAD [.mp3 ▼]   BUY CD

| Title | | CD | Ship to... | Radio Station | State | City | Date & Time |
|---|---|---|---|---|---|---|---|
| Living in a War zone, Life in Iraq | ✓ | ✓ | [Ship to...] | 94.9 KUOW | WA ▼ | Seattle ▼ | 05/04/07 6:15 AM |
| Nano Technology is the future | ✓ | ✓ | | 103.7 KMTT | WA ▼ | Seattle ▼ | 05/04/07 7:45 AM |

Products  650

| Item | Seller | BUY | QTY | Ship to... | Radio Station | State | City | Date & Time |
|---|---|---|---|---|---|---|---|---|
| Cabernet Merlot, 2002 | Columbia Valley | ✓ | | | 103.7 KMTT | WA ▼ | Seattle ▼ | 05/04/07 6:15 AM |
| Ginsu Knife Set | International Collections | ✓ | 1 | [Ship to...] | 103.7 KMTT | WA ▼ | Seattle ▼ | 05/04/07 7:45 AM |
| 2 Minute Abs | 2 Minute Abs | ✓ | | | 98.5 KDRK | OR ▼ | Portland ▼ | 05/04/07 9:02 AM |

Contributions  670

| Campaign Name | Organization | DONATE | $ Amount | Radio Station | State | City | Date & Time |
|---|---|---|---|---|---|---|---|
| Destination Joy | Make a Wish Foundation | ✓ | | 103.7 KMTT | WA ▼ | Seattle ▼ | 05/04/07 6:15 AM |
| Blue Angel Memorial... | Make a Wish Foundation | ✓ | 200.00 | 103.7 KMTT | WA ▼ | Seattle ▼ | 05/04/07 7:45 AM |
| Fund a Vision | YMCC | ✓ | | 101.5 STAR | WA ▼ | Seattle ▼ | 05/04/07 9:02 AM |

Order Details
By Vendor

This is where description text goes this is for placement this is just for placement only this is just for

Downloads: iTunes 700

[Cancel] [Proceed to Download]

| Item | | Artist/Author | Format | |
|---|---|---|---|---|
| ALBUM | The Joshua Tree | U2 | iTunes | ~702 |
| SONG | Crash | Dave Mathews Band | iTunes | ~704 |
| TRANSCRIPT | Living in a War Zone | 94.9 KUOW | iTunes | ~706 |

Products: Amazon 750

[Cancel] [Proceed to Checkout]

| Item | QTY | Ship To | Shipping Speed | Price |
|---|---|---|---|---|
| Under the Table and Dreaming - Audio CD - Dave Mathews... | 1 | Janice Johnson | 2-3 day | $11.99 |
| Under the Table and Dreaming - Audio CD - Dave Mathews... | 1 | John Doe | Next Day | $11.99 |

Products: Qüu 760

[Cancel] [Proceed to Checkout]

| Item | Vendor | QTY | Ship To | Shipping Speed | Price |
|---|---|---|---|---|---|
| Ginsu Knife Set - International Collections | Walmart | 1 | Janice Johnson | 2-3 day | $28.99 |

Contributions 770

[Cancel] [Confirm Contributions]

| Campaign | Amount |
|---|---|
| Blue Angel Memorial - Make A Wish Foundation | $200.00 |

Step 1 — Select Theme
▲ Step 2 — Review & Purchase
710

FIG. 7

DIGITAL CONTENT DOWNLOAD ASSOCIATED WITH CORRESPONDING RADIO BROADCAST ITEMS

RELATED APPLICATIONS

This application is a continuation in part of pending U.S. patent application Ser. No. 11/935,364 filed Nov. 5, 2007 which is a continuation in part of pending U.S. patent application Ser. No. 11/850,627 filed Sep. 5, 2007, which claims priority to U.S. Provisional Patent Application No. 60/865,585. All prior applications are incorporated herein by this reference in their entirety.

TECHNICAL FIELD

This disclosure relates to user interactions with radio broadcasting and, more specifically, to enabling a radio listener to quickly and easily capture data, anytime and anywhere, that identifies an item of interest that was broadcast over the airwaves, so as to support subsequent actions with respect to the identified item of interest to the listener, such as an online purchase.

BACKGROUND

Since its inception, the radio has evolved in terms of technology and quality of sound, but not in terms of becoming interactive. People frequently are exposed to music, a program or an advertisement playing over broadcast radio or the like, while at home, on the beach, in the car, etc; or they might like to donate to a radio station or a charitable cause or even cast a vote on a song or a poll being conducted "on the air." These actions may be inconvenient or impossible, depending on the user's current location and activity, for example driving a car. Some states and localities have imposed limitations on the use of cell phones, for example, while a user is driving.

Sometimes, a radio listener (hereinafter called the "customer" or "user") hears advertisements played over broadcast radio or the like at various locations where it may be inconvenient to make a note of the product or service being advertised. If the customer does not have an immediate access to the information, or cannot store that information, there will be a protracted delay between the time when they are initially exposed to the advertising and develop interest in the product or service, and the time where they actually have the opportunity to act on that interest. When they do finally have the opportunity to purchase the product, their impulse to purchase may have diminished or they may not even remember the name of the advertiser, product or service that they wish to purchase. The immediacy of the information and their interest has waned, and therefore the sale is lost.

Sometimes a listener would like to donate to a charitable cause or a radio station during a "pledge drive," but she is driving or may be in an inconvenient location at the time the solicitation is heard. She therefore may be unable to call in or access a corresponding online site and respond to the solicitation as she would have liked. At a later stage, however, her impulse to donate may have diminished or she may not even remember the telephone number to call to donate or make a pledge. The immediacy of the information and the listener's interest has waned, and consequently the donation is lost.

Similarly, the user frequently likes the song or the program he is hearing and would like to purchase that track or the album or a copy of the transcript but he is where is may be inconvenient to make a note or cannot later remember the name of that song or program. Thus there will be a protracted delay between the time when they are initially exposed to the song or program and develop interest in the product, and the time where they actually have the opportunity to act on that interest. When they do finally have the opportunity to purchase the product, their impulse to purchase may have diminished or they may not even remember the name of the item they wish to purchase. The immediacy of the information and their interest has waned, and again a potential sale is lost.

Similar challenges exist in connection with television; here there are at least two distinct scenarios. First, the matter of traditional television advertising, and second, a scenario where a customer sees a particular product or service within the television programming itself, as distinguished from a televised advertisement, and wants to buy that item. To illustrate the latter scenario, for example, suppose a customer is watching a movie, where a new cell phone is featured, and it looks great, but the customer may not even be able to see what brand of phone it is. As another example, the customer is watching a TV program, such as a cooking show, and the customer wants to get the recipe, the frying pan, the book, the glassware being used on the show. Currently, there is no convenient way for the viewer to not only identify, but immediately purchase the item of interest. A bevy of TV "shopping channels" invite viewers to call a live operator (who is "standing by") by telephone, and conduct a voice conversation to place an order, which includes reciting credit card information, shipping address, etc. The process is unduly burdensome and slow, and of course purchases are limited to what is offered for sale explicitly on that show at that time.

What is needed is a way for a customer to immediately and easily capture the relevant information in response to hearing programming content or advertisements, so that at a later stage when they have access to a computer or wireless access to a network, they can examine the automatically identified product and purchase the desired product or service with a simple action that does not require web surfing or internet research.

SUMMARY OF THE PRESENT DISCLOSURE

One aspect of the present disclosure provides a method of real time remote purchase-list capture. In one presently preferred embodiment, the method includes receiving an "activation instruction" from a user. This can be done, for example, by a simple button press on a portable capture device. (Examples of portable capture devices are described later.) In response to the activation, the method calls for determining a current frequency setting of a radio receiver located adjacent to the user-controlled device. This frequency setting is useful to identify the radio station to which the user is listening at the time of activation. In some embodiments, a time stamp also is captured by the portable capture device.

Another aspect of the invention is a system for determining a current frequency setting of a nearby radio receiver. In one embodiment, this is done through the use of an RF transmission to the nearby radio that incorporates a predetermined audio frequency signature to form a feedback loop. That is, the radio receives the RF transmission, and consequently emits the predetermined audio frequency signature, through a speaker or other audio output, just as if it were broadcast radio programming content coming from the corresponding radio station. (Preferably, the audio signature is very short and unobtrusive to the human listener.) It is recognized by the capture device (received via audio input, microphone, jack, etc), and used to confirm that the nearby radio is indeed tuned to receive the RF frequency on which the RF transmission was sent.

Another aspect of the invention includes identifying a corresponding broadcast channel (i.e., a radio station) based on the current frequency setting of the receiver, or based on recovered metadata. Based on the radio station identity, and the metadata that might include the time stamp, the method identifies what occurred on that station broadcast at that time. For example, a song (music track) that was played, a news or "talk show" program, a product or service advertisement, a real-time "call in" voting poll, or perhaps a solicitation of donations. These examples of radio programming content are provided by way of illustration and not limitation. Depending on the type of content, the user may want to take further actions, such as buying a product, a music track, or a vacation package; casting her vote in a poll, obtaining a transcript, etc.

In one embodiment, the captured data is uploaded to a remote server, which determines and presents the programming information to the user in an interactive interface, for example a web site. Interacting with the web site, the user can make final decisions or confirmations of her actions, and they are executed immediately. This removes the burden of the user having to search, shop or surf the internet to find the items that she heard about on the radio.

In another embodiment, a server application is provided that can be accessed by wireless telecommunications, e.g., via a cell phone. Radio listeners can dial a pre-determined access phone number. An interactive voice interface is implemented at the server. At the prompt, the user (caller) would say or key in the radio station frequency or call letters of the station that the user is currently monitoring. Subsequently, the can say or key in any of the commands available, similar to the ones described herein with regard to an embedded mobile application. The user also may be guided by an audio menu, such as, "press or say 1 to quu a song; press or say 2 to quu an ad [advertisement]," etc. (The coined word "quu" is a trademark of the inventor or the assignee. It can be read as "queue" or "capture" as used herein, as further explained below.) The voice application will send the corresponding commands to purchasing services servers, further described later. In this way, the user can interact with the server in much the same manner as she would using an embedded phone application as described herein, but the interactive voice system obviates the requirement of an embedded application in the cell phone or equivalent communication device.

Additional aspects and advantages will be apparent from the following detailed description of preferred embodiments, which proceeds with reference to the accompanying drawings.

BRIEF DESCRIPTION OF THE DRAWINGS

FIG. 6 is an example of an interactive display screen layout generated by a server for a client user to select items previously identified by the user's capture device or cell phone application consistent with the present disclosure.

FIG. 7 is an example of an interactive display screen layout generated by a server for a client user to purchase selected items.

DETAILED DESCRIPTION OF PREFERRED EMBODIMENTS

A. System Overview

Figure 1:
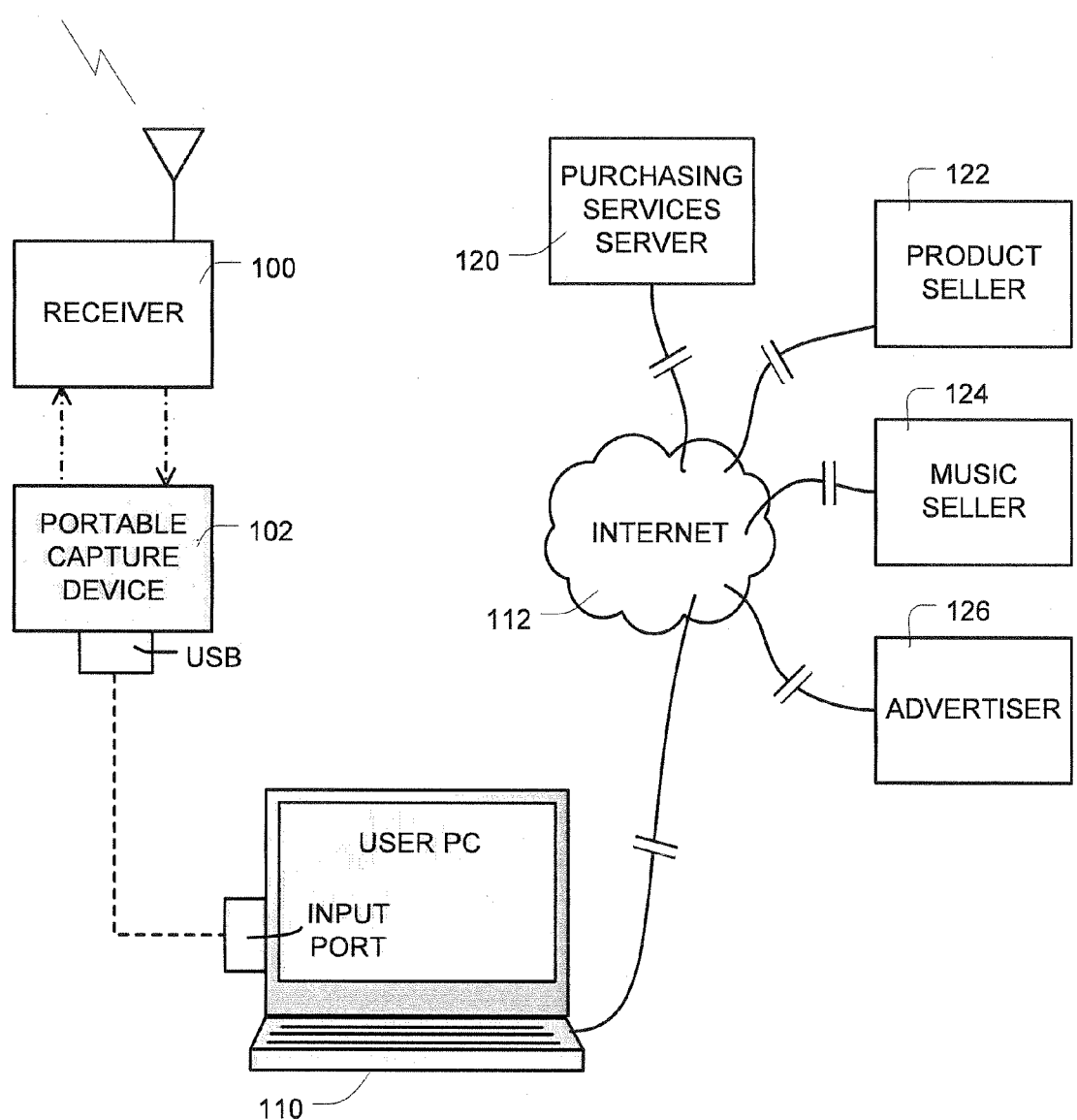
FIG. 1 is a simplified system overview of one example of a real time remote purchase list capturing system utilizing a portable standalone capture device.

When a customer hears an advertisement, a radio program or a music track on a radio, or would like to donate for a charitable, civic or educational cause or a radio station, utilizing one aspect of the present disclosure, they simply press the pertinent button on their portable capture device (the "PCD") or, in accordance with another aspect of the present disclosure, they can invoke a "quick purchase" application on their cell phone and press the pertinent button. The term "cell phone" or simply "phone" is used herein broadly to include, without limitation, all portable wireless communication devices, such as cell phones, iPhone, Blackberry, etc. that can transfer voice and or data over a wireless network.

In one embodiment, there are a minimum of three buttons on a portable capture device; one for music, one for ads, and one for transcripts and donations as described in detail later in this document. These features are described by way of illustration and not limitation. The term "button" is used herein broadly to include without limitation conventional push-button or electromechanical switches, electrostatic devices, "soft keys" on a display, etc. A "button" may be implemented as a response to voice activation as well. Any of these can be used to activate the capture device, i.e., trigger it to capture current data as further described shortly. The portable capture device, in one embodiment, identifies the radio station being listened to at the time the device is activated, and stores that information in memory.

Later, when the PCD is plugged into an I/O port of a computer, for example a USB port, it transmits station identifying information along with the metadata to a remote Purchasing Services Server, along with a unique key identifying the customer (or the customer's capture device). Several alternative embodiments for communication with the remote server are described later. The Purchasing Services Server (also referred to by applicant's trademark "Emo-V Services") authenticates the transmission and displays the items the user had "captured" earlier in different categories, for example: music, products, donations and transcripts. The server determines the corresponding items by accessing or searching station logs provided by the broadcasters or by third parties. The user can browse the selection (on their web browser or the like) for more details such as listening to the song or looking at the advertised product picture and description, decide whether they want to purchase or receive additional information, or determine the amount they would like to donate, and finalize their selection by un-checking or deleting products they would prefer not to purchase.

In one embodiment, the broadcast advertiser can upload images or video to their Quu-enabled ads. This way when the users access their account via computer and click on the ad, they can view, in addition to the description, pictures or a short video, thereby transforming an audible ad into a visual one or multi-media ad. This presents an excellent cost savings to the advertiser over say television advertising.

In another embodiment, the video or the pictures can be streamed back to the user's cell phone so that they can immediately see the product, service or campaign (donation) being advertised. See the description of cell phone applications below. Again, the advertiser or promoter can leverage the effectiveness of a multi-media campaign in the context of a radio broadcast.

The selected products are then categorized by vendor depending on the user's preferences captured during the registration, such as Amazon as a preferred online retailer or iTunes as an online music store. If the advertised product is "PCD-enabled" the user can choose to request additional information from the vendor or purchase the product. The request for information or the purchase order are made automatically by the server without further action required by the user. (Other methods for requesting information are described below.) The user can then proceed to the final step, for example by clicking on the checkout button related to each vendor, or some other equivalent user interface.

The selected products may be displayed in the vendor's virtual "shopping cart." If the user does not have a preferred vendor, the server software ("Emo-V Services™") could propose that purchases be made from the lowest priced participating vendor. If the product is a consumable good, the vendor ships the product to the customer's address as in a traditional online purchase. If the product is digital media such as an e-book or music, the vendor sends the customer an e-mail with information on how to download the media or open the relevant application such as the iTunes download. Emo-V Services preferably also sends the customer an e-mail indicating the status of their order.

B. Capture Device

A portable capture device is provided to capture the broadcast frequency or channel of the radio or satellite radio the consumer is listening to, and the time of activation. This information is used to identify the song/programming/advertisement that the customer is receiving when the capture device is actuated. In a presently preferred embodiment, the capture device has a few input buttons, to make operation very fast and simple. For example, it may have one button designated to "GET Ad" Or "PRODUCT." The user presses that button, or otherwise activates the device, in order to capture and store the information about a product being currently advertised (or last played) on the radio, as further explained below.

To identify the radio station (broadcaster) currently playing, the capture device finds the frequency of the current broadcast as follows. It has an on-board, low-power radio transmitter. That transmitter broadcasts only up to a few meters. The audio portion or "content" being transmitter is a simple audio tone, or a series of say three or four tones, that forms an audio "signature." That signature preferably is very short, perhaps 500 msec total duration. The on-board FM transmitter sweeps over the usual range of FM broadcast carrier frequencies, e.g., approximately from 87.5 to 107.7 MHz. A sweep over that range should be completed in a few seconds, although the sweep speed is not critical. The point is to take only a short time to acquire or "detect" the frequency to which the radio is currently tuned to.

When the sweep frequency equals the current radio setting, the radio will receive the nearby low-power FM broadcast, and thus receive the audio signature carried in that broadcast. The audio signature will "play" through the speaker(s) along with the other programming. The capture device also includes a microphone to detect the "audio signature" when it is played. Detection of that signature indicates that the current FM broadcast frequency of the sweeping transmitter is the receive frequency to which the nearby radio currently is set. Again, the audio signature preferably is short enough to be unobtrusive to the user/listener.

In an alternative embodiment, the radio station detection technology described above can be implemented in a mobile phone or other electronic device such as an MP3 player, etc. In case of a cell phone, when the user activates this feature (using any command the cell phone allows such as a hotkey or a speed dial or any other way), the phone would detect the radio frequency instead of the user having to determine the station. The user might have the possibility to manually select the station and override the automated system. The cell phone contains most of the components in the capture device. By adding to the cell phone an FM emitter and possibly a receiver, or a transceiver, the software running on the device's microprocessor could run on the cell phone's processor and execute the same functions as the portable capture device in order to determine the signal the radio is currently tuned to receive.

FIG. 1 is a simplified overview of one example of a real-time remote purchase list capturing system utilizing a mobile stand-alone capture unit. In this drawing, a receiver 100 is typically a radio receiver, and may be a portable unit or one installed in a motor vehicle. It may be, for example, a satellite digital radio, a terrestrial digital radio, or a conventional analog radio. For the present illustration, we will assume that it is an FM radio or one that includes capability to receive on FM frequencies. A portable capture device 102, described in greater detail later, comprises a small, battery-operated device that may be carried by a user. Conveniently, it may be implemented as a key fob. We assume that the portable capture device 102, for the present discussion, is located within a few feet of the receiver 100. So, for example, the user of the portable capture device may be the driver or a passenger in the motor vehicle where receiver 100 is installed. When content of particular interest is playing on the radio, for example a music track (a song), the user can activate the portable capture device 102 to capture information that can be used to purchase the song then playing.

For example, in one embodiment, the capture device 102 will determine the current frequency setting of the receiver 100, as well as the RDBS (Radio Broadcast Data System) data broadcasted at that frequency. The portable capture device 102 stores this information in an internal memory. The information fields provided by the RDBS may include, for example, clock time, a unique station identifier (with country code prefix), program type, "radio text" (free form text message), etc. In some cases, the radio text may identify a current music track while it is played. Which fields are decoded will vary from one receiver to another. In some cases, a music track (song) identifier is provided in the RDBS data.

Later, after the user has returned to her home or office, or otherwise has access to a computer, the user can access remote purchasing services, as explained later, for example, a services server coupled to a communications network. Such a server may be accessed via wired and or wireless networks as further explained later. In one presently preferred embodiment, the user accesses the services server via the Internet. The capture device has a memory, for example flash memory, on which is stored a device application program that automatically manages the device operations in conjunction with an on-device processor (illustrated in FIG. 4 as onboard processor 445). For example, the device application program can be arranged to launch automatically when the capture device is plugged into a USB port on the user's home, office or other computer, and it downloads the stored information from the portable capture device memory into the computer (illustrated in FIG. 1 as computer 110). In one embodiment, the program then auto-deletes the data from the device without having to wait for any signal from the remote Services Server.

In one embodiment, the portable capture device may have a USB port, or other standard port, wired, wireless, infrared, etc., which can communicate with a corresponding port on the computer 110 (or with the server as explained later in this document) for the purpose of downloading the stored capture data. Of course, the user may have activated the capture device, as described above, multiple times and each time it is activated, the corresponding capture data is stored in the memory, and all of that data can be downloaded to the computer 110 whenever convenient, automatically or manually.

As noted, the computer 110 has access to the Internet 112. A remote Services Server 120 provides various services to the user, and to others, as further explained below. In the present example, we assume that the user has "captured" data associated with one or more advertisements and music tracks, as described above. After the capture data is downloaded to the computer 110, it communicates with the purchasing Services Server 120 in order to facilitate purchasing the music tracks or the products of interest to the user.

As mentioned, in other embodiments, the portable capture device can be coupled to a portable communication device, such as a cellular phone, an iPhone or Blackberry device which is capable of communicating with a remote network and a server coupled to the network. In that case, no separate computer is required. In still further embodiments (not shown), the disclosed capture functionality may be provided in a software application deployed in a cell phone, "smart phone" or the like, iPhone, Blackberry, etc. Depending on the particular device, supplemental hardware may be needed. In other cases, "software radios," audio circuitry and such on board a multi-function portable device may provide adequate functionality, subject to appropriate programming in view of the present disclosure. When the user accesses the Services web page on their computer (the same page that opens when the user inserts the mobile capture device in the USB port or when they use their cell phone application) they see the information related to all the items they had "clicked on" and can proceed to purchase or request additional information as if they had used the mobile capture device.

Turning now to FIG. 6, this shows an example of a screen display layout that is generated by the purchasing services server 120 for a particular user (we assume that the user has logged into the server with appropriate credentials such as a user name and password). Referring to FIG. 6, a first portion of the screen display 600 includes a listing of the music tracks, advertised products, donations and transcripts identified by the capture data that was initially stored in the portable capture device 102 and then downloaded to the computer 110. The computer 110 includes appropriate application software for communicating with the purchasing services server as shown on FIG. 1. In the screen display of FIG. 6, the first line in section 600 shows data for a song entitled, "I Still Haven't Found . . . " This shows that the song is available for purchase (as distinguished from the album which is grayed out), and it shows the radio station, state, city, date, and time when the song was played. That data corresponds to the data that was captured by our illustrative user, using a portable capture device, who was in the car traveling when the song was played. Using this user interface, or something similar, the user can review the songs associated with the data that was captured, and make decisions as to what items to purchase or not purchase. After the user has completed the review, and is ready to purchase selected items, she may interact with a screen display along the lines illustrated in FIG. 7.

In FIG. 7, a first region 700 shows various downloads that were previously selected by the user from among those identified based on the capture data. In this example, a first line 702 of the region 700 shows an album called "The Joshua Tree" by the artist U2 available in iTunes format. The next line 704 shows a song called "Crash" by the Dave Matthews Band also in iTunes format. The third line 706 shows a transcript of a radio program called "Living in a War Zone" which is available from radio station 94.9 KUOW also in iTunes format. In one embodiment, after the user makes her selections, referring to FIG. 6, the user may designate certain preferred vendors, in connection with the user setup procedures, described later. Once a user's selections are finalized, the user can simply press the button marked for example 710 "Proceed to Download" to complete the purchase. When the button 710 is asserted, the server 120 will forward the completed order directly to iTunes, or whatever the selected vendor may be, and the purchase is completed. In this way, the user avoids actually "browsing" or "shopping" on the target vendor site. The selection of the desired items has already been done by the server software, again based on the capture data discussed earlier. The purchasing of other items such as products and contributions to charitable entities shown in FIG. 7 are also described in more detail later.

Referring once again to FIG. 1, a music seller 124, such as the iTunes web site, is shown as coupled to the Internet 112 to carry out the purchasing methodology just described with reference to FIGS. 6 and 7.

Figure 2:
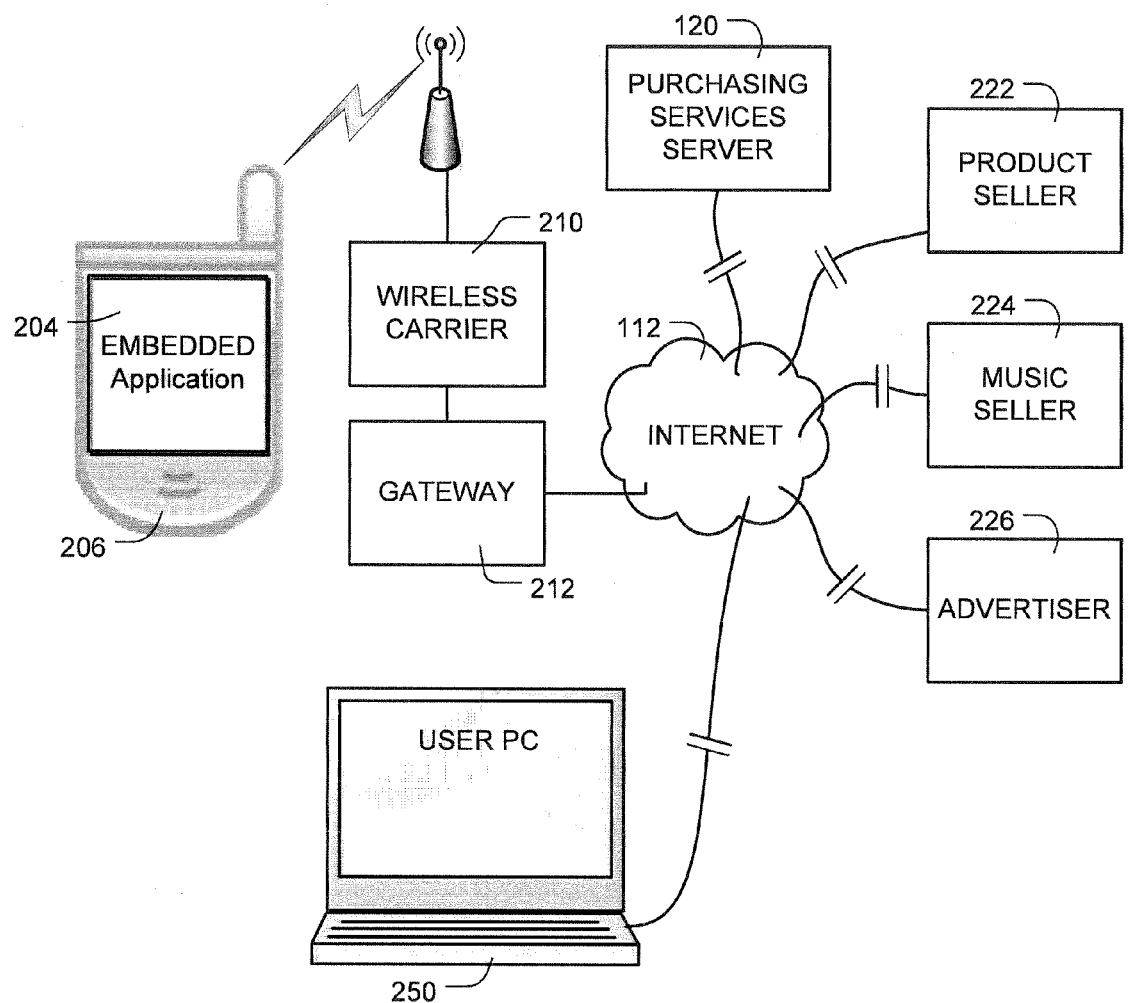
FIG. 2 is a simplified system overview of a second example of a real time remote purchase list capture system utilizing a cellular phone application.

FIG. 2 is another simplified high-level diagram of a second example of a real-time remote purchase list capturing system. This diagram is similar to that of FIG. 1, except that, in this case, instead of a stand-alone capture device 102 (in FIG. 1), an application for data capture 204 is installed on a cell phone 206. The cell phone 206 is capable of communicating with a wireless telecom carrier 210. In this implementation, cell phone 206 in combination with embedded software 204 can be used to capture interest data, as described above with regard to the portable capture device 102, and then transmit that capture data via the wireless telecom system, through SMS or other methodologies such as MMS or web-services, to the purchasing services server 120. In the case of the cell phone application, other functions can be implemented as the usage is not limited to the number of buttons on the device. For example buttons that allow the user to vote yes or no on a question being asked can be implemented by a simple change of configuration. Voting capability from the cell phone is reflected in near real time in reports available to the radio stations or the pertinent party. Then, as before, once the user arrives at a location where she has access to a computer 250 in FIG. 2, she can proceed to interact with the purchasing services server 120, using interactive screen displays of the type illustrated in FIGS. 6 and 7 to make her selections and complete desired purchase list. The described cell phone application preferably can be downloaded via the wireless network and installed in the cell phone.

In another embodiment, an ordinary cell phone or the like, with or without a dedicated application Installed as described above, can be employed for capture functions using the voice channel. To enable this embodiment, a server application is provided that can be accessed by wireless telecommunications. In one example, the Purchasing Services Server described above can execute or be couple to a suitable application. Radio listeners can dial a pre-determined access phone number. An interactive voice interface is implemented at the server. At the prompt, the user (caller) would say or key in the radio station frequency or call letters of the station that the user is currently monitoring. Subsequently, the can say or key in any of the commands available, similar to the ones described herein with regard to an embedded mobile application. The user also may be guided by an audio menu, such as, "press or say 1 to quu a song; press or say 2 to quu an ad [advertisement]," etc. The voice application will send the corresponding commands to purchasing services servers, further described later. In this way, the user can interact with the server in much the same manner as she would using the embedded phone application described above, but the interactive voice system obviates the requirement of an embedded application in the cell phone or equivalent communication device.

Operation of the Capture Device

Figure 3A:
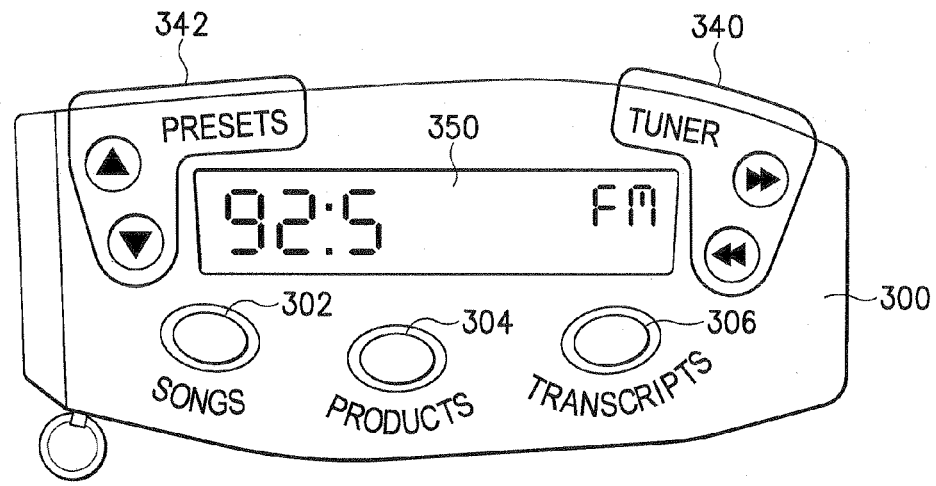
FIGS. 3A, 3B, 3C, and 3D show one embodiment of a portable standalone capture unit in front, left, right and rear side views, respectively.
Figure 3B:
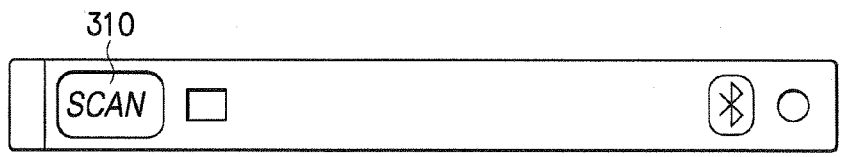
Figure 3C:
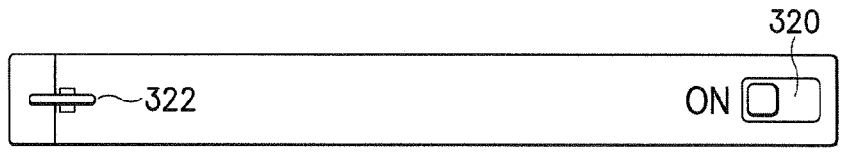
Figure 3D:

Turning now to FIGS. 3A-3D, one embodiment of a mobile stand-alone capture unit 300 is illustrated in front. FIG. 3A shows the front side of one embodiment of a portable stand-alone capture unit. FIGS. 3B, 3C, and 3D show the capture unit in rear, left-side, and right-side views, respectively. Referring to FIG. 3A, in a preferred embodiment, the portable capture unit measures only a few inches in length, and can be used as a key fob so that it will be available to the user as needed, especially when the user is traveling in a motor vehicle, aircraft or other conveyance. The capture unit 300 preferably is battery-powered, and requires no external power source. In one embodiment, the capture unit 300 has three operating buttons, labeled something like "Songs" 302, "Products" 304, and "Other" 306 in the drawing, although the exact labels are not critical. Symbols or icons may be used in addition or in lieu of text. In operation, when the user hears the song playing that she wishes to purchase, she simply pushes the button 302 to activate the capture unit. In response to that activation, the capture unit 300 detects the current frequency setting (or station) of a nearby radio receiver, such as the radio in a motor vehicle in which the user is riding. Examples of specific circuits and methodologies for determining the current frequency setting are discussed below.

In addition, the capture unit 300 includes a digital memory (not shown) for storing the captured activation time and the determined current frequency setting of the nearby radio. In addition, the capture unit 300 preferably includes an RF receiver for capturing and decoding RDBS data. This stored information will be used subsequently to determine the name of the song that was playing when the capture unit 300 was activated. In this way, the present system enables a customer to purchase products (or arrange for the purchase of products) with a single-button click from virtually anywhere at any time, and in particular immediately upon hearing an advertisement for a product on the radio, or hearing content of particular interest. That content may be a song (music track) or other types of programming such as, for example, a news summary or editorial commentary. For these types of content, the user may want to purchase a transcript (in printed, electronic, or other form).

Referring again to FIG. 3A, in the situation where the user wishes to purchase a product that was featured in a radio advertisement, the user once again need only press a single button, namely the "Products" button 304 in FIG. 3A. Similarly, if the user hears a news summary, panel discussion, or other primarily verbal presentation, the user can initiate purchase of a transcript simply by pressing the "Other" button 306. Similarly, if the user wishes to donate to a radio station, a program, or other cause, the user can initiate the donation simply by pressing the "Other" button 306. In all four examples, the capture unit 300 will operate in a similar fashion to determine the current frequency setting or station to which the radio is tuned and the ID of the button that is pressed. As before, this information is stored in a local digital memory.

FIG. 3C illustrates the opposite side of one embodiment of a capture unit. This figure shows a power switch 320 and an attachment for a key ring or the like 322. FIG. 3D shows the back side of one embodiment of a capture unit 300. In this embodiment, a connector, for example a USB connector 330 is shown for the purpose of downloading the stored capture data to a computer or similar device. In the illustrated embodiment, the USB connector 330 is arranged to slide in and out of the capture unit by operation of a thumb actuator 332. In other embodiments, the capture unit may be configured with a wireless communication capability, for example Bluetooth, in which case a physical connection such as a USB port is not required to download the stored capture data. Other embodiments of a portable capture unit may include wireless communications systems that allow the device to communicate in real-time with the server, without requiring further communication with the personal computer. In this case the user logs in the "Myquu.com" or similar page and accesses the data that was stored. Other embodiments of a portable capture unit may provide different appearance or interfaces; the illustrated embodiment is merely illustrative.

FIG. 3A also illustrates tuner controls 340 and presets control 342. These controls are optional and are not required in some embodiments. These controls, where implemented, would enable the user to manually set the capture unit to a particular radio station in the event that the internal frequency detection circuit (described below) is unable to determine the current frequency setting of a nearby radio. The acquired frequency setting, whether it is acquired automatically or manually, may be shown in a display 350, although the display is optional. In other embodiments, an audible beep may be implemented to inform the user that the capture device has determined the current frequency setting of the nearby radio.

Figure 4:
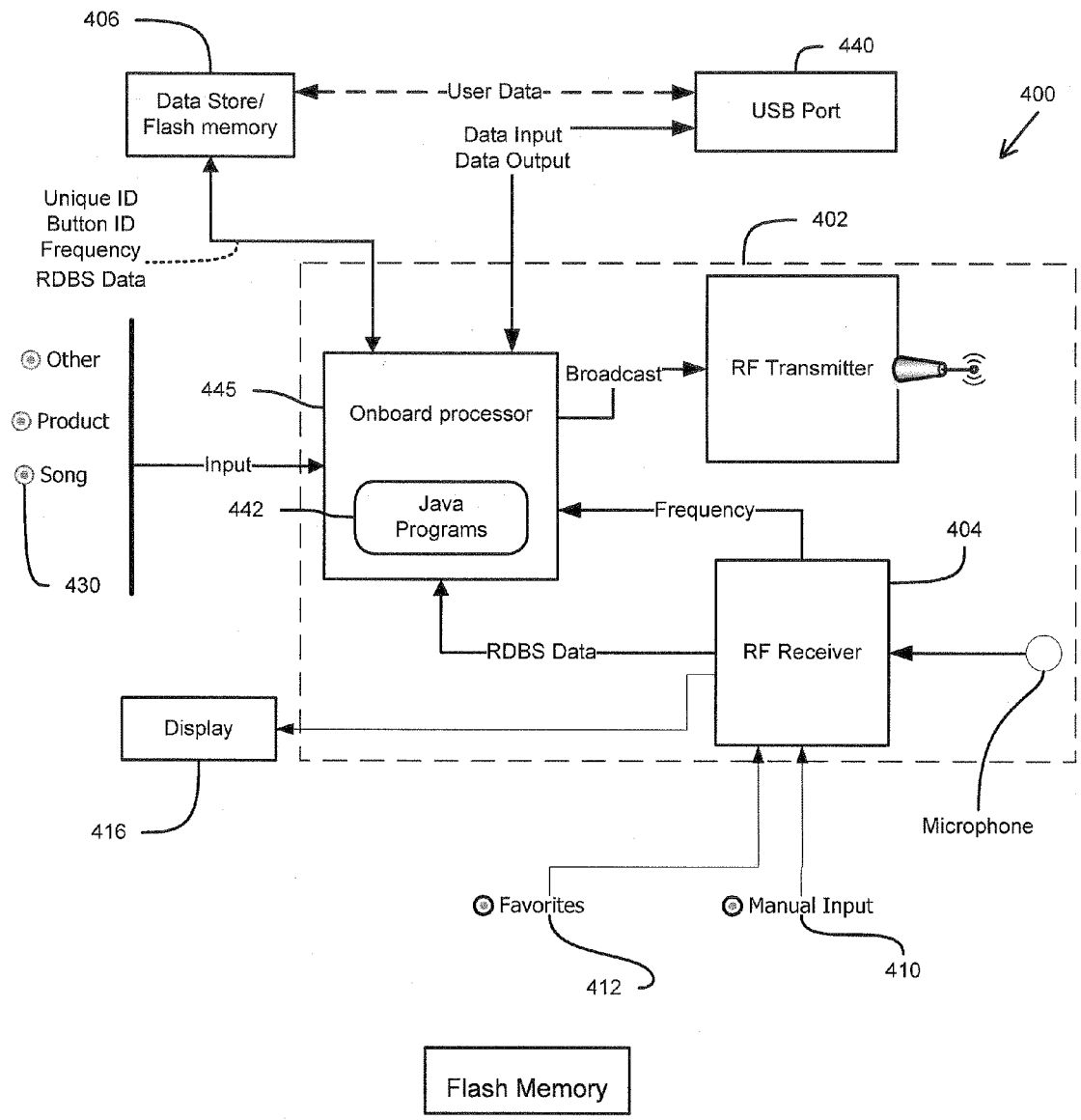
FIG. 4 is a simplified functional block diagram of one embodiment of a portable capture unit.

FIG. 4 is a simplified functional block diagram of one embodiment of a portable capture unit. The capture unit 400 shown in the block diagram of FIG. 4 may be the same, or may be a different embodiment, from the embodiments discussed above with reference to FIG. 3. In FIG. 4, a capture unit 400 may be implemented in various ways. For example, it may take the form of a portable capture unit as discussed above with reference to FIG. 3. In an alternative embodiment, the capture unit 400 may be integrated into a radio receiver or the like. Referring to FIG. 4, the capture device includes an RF detector circuit 402, which detects the current frequency setting of a nearby radio. The frequency or station information is stored in a digital data store 406.

The radio receiver frequency (station) setting can be determined in any of several ways. First, as mentioned above, if the RF detector 402 does not succeed in getting a "fix" on the radio station, that information could be input manually to the capture device 400, as indicated by the manual tuning input 410. In the embodiment of FIG. 3A, these manual tuning inputs would correspond to the inputs 340. The circuit 400 can also include a manual favorites inputs 412, which in the embodiment 300 of FIG. 3 may correspond to the "presets" inputs 342. In any case, the FM receiver 404 can in one embodiment display the current frequency setting on a display such as the liquid crystal display 416.

The capture circuit 400 also includes a few buttons 430 such as the one labeled "Song" in the drawing, indicating that the user presses button 430 to provide an activation input to the capture device which, in turn, activates the RF detector 402 to capture the current frequency setting as discussed above. Other buttons labeled in the drawing "Product" and "Other" allow the system to identify the user's intentions. The capture circuit 400 of FIG. 4 may also include a clock integrated to the onboard processor 432 to capture the time when the song click 430 or other activation input is received. In some embodiments, the song click button 430 corresponds to the songs button 302 of FIG. 3A. In some embodiments, the clock circuit 432 can be omitted. For example, in the context of digital radio, where the radio signals from the broadcaster include embedded metadata that itself includes a time stamp, use of the clock circuit can be omitted Digital radio metadata also includes the station number or other identifier of the broadcast station. As indicated in FIG. 4, either the station ID metadata or the receiver frequency, as the case may be, are provided to the data store 406. The receiver frequency alone may not uniquely identify the station, as radio frequencies are reused in different geographic markets. However, where the station ID is not recovered from metadata or RDBS, the Services Server if necessary can determine the station based on the frequency, capture unit ID, history and other factors. The capture circuit 400 also includes, in some embodiments, a download port such as a USB port 440 for coupling the capture circuit 400 to a user's computer or the like. As noted, a wireless port can be implemented in some embodiments in addition to, or in lieu of, a physical connection such as a USB port. In some embodiments, the capture circuit 400 also includes executable program code 442 managed by the onboard processor 445 and storing the data in the data store 406 and configured for interaction with the user's computer via the USB port 440, or the like, for downloading the capture data described earlier.

Above we described one embodiment of a portable capture device. It provided a simple user interface using only a couple of buttons. Additional features and functionality can be provided in various alternative embodiments of a portable capture device. For example, recall the advertisement scenario in which a user hears an ad that is of interest to her. Instead of a simple "get" or "capture" button, as described earlier, she may select a different function called, for example "queue" in order to queue the ad for later follow up. (The actual name of the function, or the particular text or icon that appear on a corresponding button or display are not critical.) More important is that additional options are made immediately available to the user. For example, in one embodiment, a menu will appear on a display screen to offer some further options. These choices can include but are not limited to the following operations:

1. "Quu it" (or "Queue it") is a first user input or selection option which would transmit data that identifies the current ad to a remote server so that the user can access it later, for example from her web application. (The word "Quu" is a coined word adopted by applicant to serve as a trademark for use in connection with products (e.g. a remote capture device) and or related services such as those described herein for assisting users in capturing and acting on information received over broadcast media such as radio and television. In this regard, the data initially sent to the server may not identify the advertisement directly. It may comprise metadata as explained earlier. The specific user interface is not critical. It may comprise more or fewer dedicated buttons, a display screen, "soft keys," voice activation, or a combination of all of these. Another option is "local queue" in which the data is temporarily stored, for example, if a communication channel is not currently available for transmission to the remote server. The capture device can be programmed to retry the data transfer periodically or when it detects an available channel, or when indicated by the user.

2. "More Info": (Again the exact label is not important.) Responsive to this second illustrative user input selection (key press, etc.), the mobile device/application sends data to the server indicating that the user would like more information about the ad they just heard (or viewed or read; more on this later). Responsive to receiving this command, the server triggers an application that can automatically command a telephone application (could be an Internet phone or a standard land line or mobile, or any device capable of calling telephone numbers). The telephone application in turn would call the user and play a message previously uploaded to a server (by the advertiser or the radio station or any other party on behalf of the advertiser). The telephone number(s) to call are stored in advance in the user's profile or personal account data in the server. The message delivered by phone could be a recording or an automated text-to-speech system that would read an uploaded text. At the end of the recording, the user might be asked if he would like to talk to a representative, and if the answer is yes (either expressed verbally or by pressing a key on the phone) the call might be routed to a seller's agent or call taker desk immediately, or the "hot lead" information can be sent to the seller so that they can call the user later.

3. "Call me": Responsive to this third illustrative user input selection (key press, etc.), the mobile device/application sends data to the server comprising a command showing that the user desires to be called by the seller or a representative of the seller, typically either to ask for more information or to make a purchase. When the server receives this data, it triggers an alert to the seller by means of either or a combination of, but not limited to, available communication technologies such as an SMS, an email, a report etc. The seller can then call the user and conclude the desired transaction. Both the user and the seller or advertiser benefit from capturing a potential transaction that otherwise was likely to be lost.

Details of the relevant internet, communications, client and server technologies are know to those skilled in the art and are omitted here to avoid obscuring the present invention. The device could communicate with the server directly, as an alternative to connection through a user's computer internet service. The device can communicate using wireless technology that is commonly used in cell phones, or wireless internet technology. With regard to wireless telecom, various voice or data channels can be used. In another alternative, an "in-band signaling" modem can be used. In-band signaling uses the voice channel to transmit small amounts of data. This approach is advantageous as voice service typically is inexpensive and nearly ubiquitous in availability. It also makes the transaction independent of the wireless carrier. In general, the device would contain standard wireless communication hardware that would transmit the data to the server as soon as the user activates the device via the user interface, or automatically, as discussed above.

In another alternative embodiment, the capture device could be voice activated by employing known voice recognition apparatus (hardware and or software) so that the commands are not given via a push button, but also by voice. The voice recognition can be relatively simple as only a very limited vocabulary is needed in this application. That said, once voice recognition is provided, the type of commands will not be limited to those when using the buttons, but could be expanded to include some or all of the commands available from the mobile application. To illustrate, the user for example could give a voice command such as "quu that song" or "call me regarding this ad", etc. The device supported voice recognition apparatus (widely available) interprets the commands and transforms them into text commands similar to the ones obtained by pushing a button on the device or a menu item on the mobile application. The device can then upload this information to the server by any communication way discussed above (for example, wired or wireless connection to internet service or wireless telecommunication services).

In another embodiment, a capture unit 400 may be integrated into a portable remote control of the type commonly used with a television receiver. Much of the description herein that applies to radio broadcasts can be applied to other broadcast media such as television as well. In the television scenario, the user may be watching a television show (sit corm, news, a movie, etc) or a commercial advertisement, or an actual offer for sale of goods or services. Using a portable data capture unit of the type described herein, either dedicated or integrated into a household remote control, the user can easily capture data indicative of the current program, advertisement, etc. The captured data can be used as explained above with regard to radio broadcasts. The remote control unit can facilitate capturing the current television station identity. The portable remote control may "know" the station currently being viewed, or it can be configured to interact with the television receiver to acquire that datum. At the server side, data sources can be accessed as necessary to acquire more information about the programming or advertisement, similar to the radio scenario.

Figure 5:
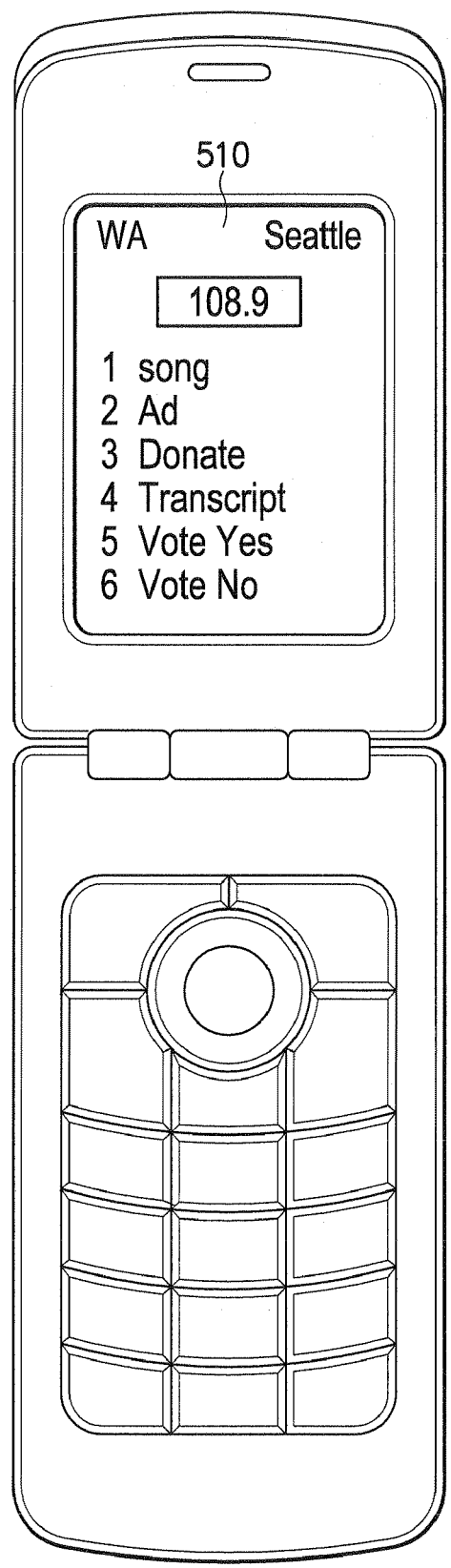
FIG. 5 is a front plan view of a cell phone, personal digital assistant (PDA), or the like showing one example of a screen display layout (user interface) implemented by a capture application program.

FIG. 5 is a simplified illustration in front view of a personal digital assistant (PDA), cell phone, or the like, showing one example of a screen display layout associated with an embedded capture system. In other words, in this implementation the capture system is implemented in part in client side software. In FIG. 5, an application program is deployed in a cell phone or other "smart" device with wireless communication capability for remote capture and related services as described herein.

In this example, the application program (not shown but stored in memory) implements a display screen layout 510 that provides several functions. At the top, it shows the current city and state settings. These are used to access a stored database to look up radio stations in the selected city, based on the determined transmission frequency, also displayed (here "106.9 FM"). The frequency may be captured by capture circuitry (transmitter and receiver), as described above, or recovered from embedded metadata in the radio broadcast signal, or simply entered by the user. For user entry, the user can enter city and state, and then enter a frequency or just scroll through a list of local stations provided by the internal database. The database of local stations can be updated periodically using techniques that are known in other contexts. Favorite stations or "presets" can also be stored for easy retrieval. These may be especially convenient for stations where identifying information may not be available automatically.

The display 510 also presents options for various types of items the user may wish to "capture" and purchase or otherwise act on as appropriate. For example, the drawing presents user options to select a song, a product advertisement ("Ad"), a solicitation for a donation ("Donate"), a copy or transcript of a radio program ("Transcript"), or voting ("Vote yes" or "Vote no") in response to a live radio broadcast poll. The display shows a corresponding key or number for the user to press on the keypad to make the desired selection. The details of this interface are not critical. The functionality is dramatic as compared to prior art. For example, compare the effort and convenience of one key press to order a transcript, versus grabbing a pen and paper, while driving a car, to write down an address, then later writing a paper order, writing a check, and snail mailing the whole business to order a transcript (paper or electronic), which may take weeks to arrive. Using features of the present disclosure, the desired e-transcript may already have arrived in the user's computer when she arrives at the home or office.

In an embodiment where the device 500 comprises a cell phone, the wireless telecommunications network can be used for downloading the captured data to a server. That type of implementation is illustrated in FIG. 2, discussed above. In that embodiment, the wireless carrier 210 transfers the capture data via the Internet 112 to a purchasing services server 120. In other embodiments, where the capture data is downloaded to the user's computer (see FIG. 1), the capture data is again transferred via the Internet 112 to a purchasing services server 120.

The purchasing services server on a preferred embodiment implements a user interface, for example, along the lines of that illustrated in FIG. 6. FIG. 6 is an example of an interactive display screen layout generated by the server for a client user to select items previously identified by the user's capture device as discussed above. The particular layout of the interactive display of FIG. 6 can take various forms. In this illustration, the screen display includes a first portion 600 which displays music items identified by use of the capture data discussed above. For example, in the region 600, each line of the display corresponds to a song or music track (six of them are shown), and the display shows the radio station, state, city, date, and time at which that particular track was played, and the associated data was captured by the user.

A second region 630 of the screen display lists transcripts (two of them are shown) that were "captured" by the user. Again, the transcript was not literally captured, but the station identification and possibly RDBS data were captured, which, in turn, are used by the server to identify the particular transcript. Here, by using interactive checkboxes, the user has decided to buy a CD with the first transcript and to purchase an MP3 download with the second transcript.

A third region 650 shows a list of products that were identified as having been advertised when the associated data was captured. Again, the radio station, state, city, date, and time are shown. In this case, the user has elected to buy only the second of three items shown on the list.

And finally, a fourth region 670 of FIG. 6 lists some contributions that the user may decide to make; for example, to charitable organizations who had advertised or solicited donations on the radio and the user captured that information as described above. In this example, the user has decided to donate only to the second campaign shown on the display, "Blue Angel Memorial", and has elected to donate the sum $200 by filling in that amount in the box provided for that purpose.

To summarize, the screen display of FIG. 6 shows the user all of the items that were "captured" by the user, and enables the user to review the list, select particular items for purchase, or not, and otherwise complete necessary details in preparation for a purchase or donation or a request for more information on a product, as appropriate. After the user has completed this information, she can instruct the server to continue with arranging purchase of the items that were designated by the user for purchase. This may be done, for example, by pressing a continue button 680. The continue button may result in display of a user interface screen display similar to that shown in FIG. 7. Again, these interactive screen displays are generated by the purchasing services server 120 or the like, operational over the Internet or a similar public network using technologies such as HTML that are well known.

Referring again to FIG. 7, in some embodiments, the server system will take the selections made by the user interacting with FIG. 6, and then shop around via the Internet to find the best prices for the items selected by the user. This can be done transparently behind the scenes. In other embodiments, the system may default to purchasing selected items from vendors that the user selected in advance in the course of user setup preferences. Details of web site user setup, login procedures, and preferences are omitted because they are well known. After vendors have been selected for the purchases indicated by the user, the display screen of FIG. 7 shows the order detail arranged by vendor. In the first section 700, the vendor is iTunes and three items have been selected. If these are correct, the user can simply press a button 710 "Proceed to Download" and the download will occur. In this case, there are three downloads. In a second region 750, the display screen shows the products selected for purchase from amazon.com. In this case, there are two audio CDs already selected for purchase. The user need only press the button to proceed to checkout. The next region 760 shows a product (Jinsu Knife Set) to be purchased from WalMart. Shipping information and pricing are shown. Finally, a region 770 in the screen display shows the campaign to which the user elected to make a donation of $200. The user need only press a single button to confirm the contribuution. Again, the user setup in Preferences may be used to establish the method of payment.

As noted earlier, the data capture functionality on the user side can be a downloadable into a cell phone or other personal communication device as an application. Several embodiments are within the scope of this disclosure. For example, the application can be configured to communicate to the remote server using any available messaging service, for example, SMS, MMS or web services.

In an alternative embodiment, the novel capture application can be implemented as a web application that the user can use on their phone internet browser. In one preferred embodiment, the application will run when the user invokes it from a mobile based browser without having do download or install any special application. The application would behave in a similar manner to the installable application described above and would have similar functionality.

In an alternative embodiment, the user could simply send a text message (e.g., an SMS message) to a specified phone number operatively coupled to a remote server. The message would be interpreted by the server in the same way it interprets the data coming from the application. In this case, the server can be linked to a SMS provider and can receive data via SMS. The message can include the radio (or television) station frequency, and/or the station's call letters, and/or any other relevant data. The server interprets the data and adds the items to the user's account. The server can access related data sources, e.g. station programming logs or play lists, as necessary to complete the data.

In another alternative interface, the user could call a phone number and say the station frequency or call letters or both, and/or any other relevant data such as "ad" (advertisement) or "song" etc. The message would be decoded by a voice recognition software and transformed into a text message that is interpreted by the server like any message arriving from the phone application. The server interprets the data and adds the items to the user's account as before. This model is slightly more burdensome on the user but it requires no special hardware or software; just a telephone (landline, internet, wireless, etc.)

Applying still another alternative interface, the user could send an MMS or an email from his phone (or any portable device with that capability, e.g., iPhone®, Blackberry®, etc.) that could be interpreted by the server like any message arriving from the phone application. The user would simply send an MMS or an email to the specified number. The message can include the radio station frequency, and/or the station's call letters, and/or any other relevant data. The server interprets the data and adds the items to the user's account.

Many commands can be added to the embedded mobile application described earlier. It is not limited to the commands we described earlier. For instance, in one embodiment functionality is implemented in which a user hears a broadcast ad, and then selects the function to queue that add. A menu will appear with choices such as the following:

(1) "Quu it" (i.e. capture it), which would send the data to the server so that the user can access it later from his web application.

(2) "More Info": so that a an automated system would call the user and a recording with more information would play. At the end of the recording, the user may be asked if he would like to talk to a representative, and if the answer is yes, the call can be routed to a seller or agent, or the information can be automatically routed to the seller so that they contact the user later.

(3) "Call me": which sends a command to the seller to call back the user.

(4) "Stream back": which would stream back a video (as described above) about the advertised product or service or song etc to the cell phone.

Figure 8:
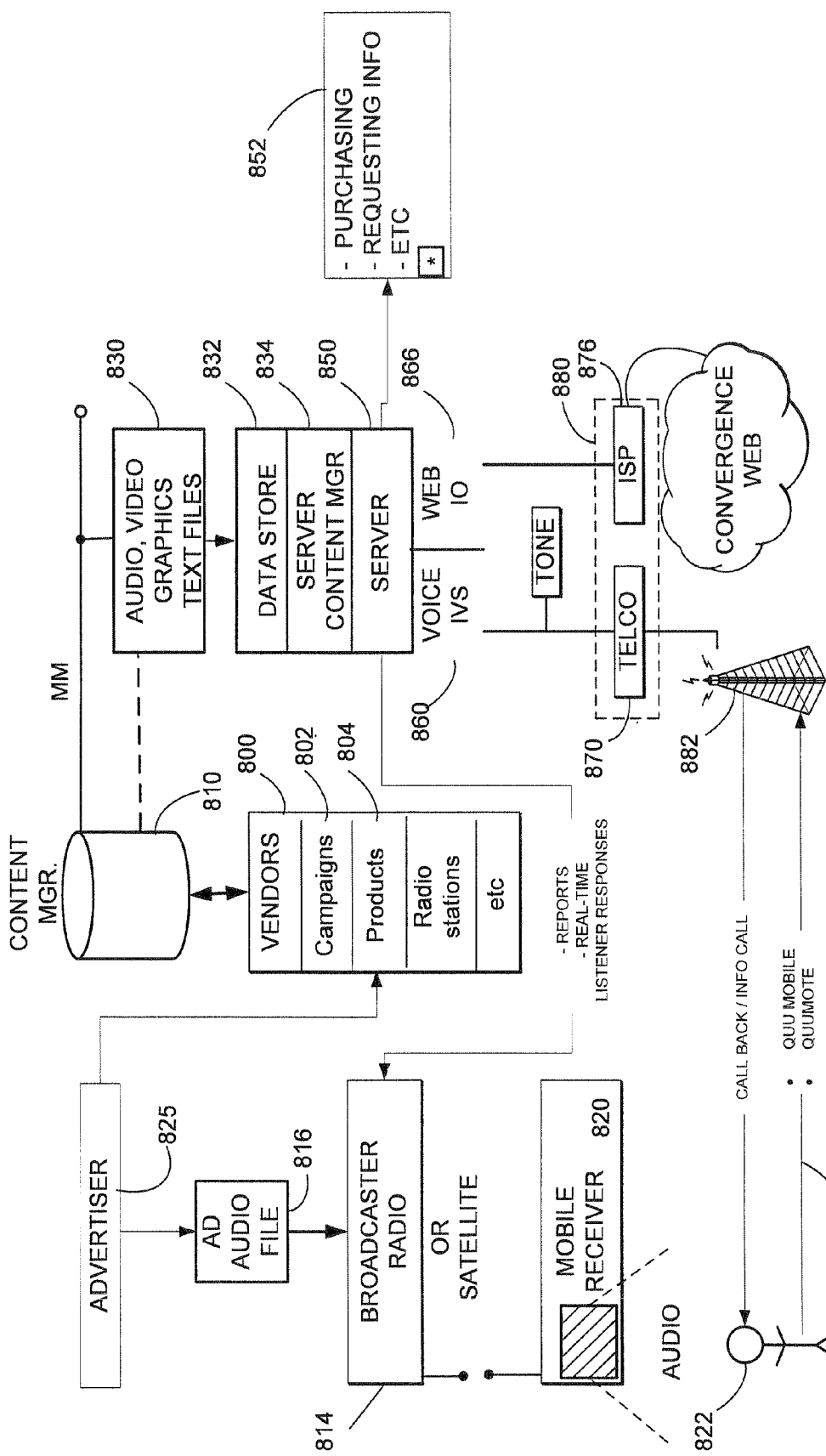
FIG. 8 is a simplified block diagram illustrating individual user delivery of multi-media content associated with a radio broadcast item in accordance with one embodiment of the present invention.

FIG. 8 is a simplified block diagram illustrating in more detail a presently preferred embodiment to implement individualized user delivery of multi-media content associated with a radio broadcast item. In FIG. 8, a vendor 800 provides content which is stored and maintained by a content management system 810. the content manager may be part of a server (850) or a separate server and or datastore. We also refer to the content manager module as a "business manager" module or server, as this system interacts with business entities, as explained below, as distinguished from the server system 850 which principally interacts with customer/users.

For example, an advertiser 825 may contact a broadcaster 814 to arrange for radio advertising, i.e. "buy time." The "broadcaster" 814 in practice may be a single radio station, or a broadcasting syndicate, network, etc. The advertiser 825 delivers an audio file 816 to the broadcaster 814 comprising a radio advertising spot, say a 30-second prerecorded audio advertisement for the exercise equipment made by vendor 800. The radio broadcaster then airs the ad at the agreed-upon time slots/schedule. The broadcast may be via terrestrial or satellite radio systems. The radio transmission, including the advertisement 816, is received at a radio receiver 820, where it is heard by a user 822.

In addition to airing the traditional audio advertisement 816, the radio broadcaster or station 814 may offer additional services, namely digital download services to provide additional digital content to interested users who hear the advertisement. This capability transforms the audio advertisement into a multi-media, interactive experience. In this example, the radio station creates a "campaign" for the corresponding product. The radio station sets up the campaign 802 (a "Q-campaign") using the business or content manager server system 810. An advertiser, retailer or radio broadcaster can log into the business server 810 as appropriate. Preferably, the server may be implemented as a web site. In this example, the radio station 814 logs into server 810, and selects the advertiser 825 and the product (in our example, an exercise machine), and sets up the campaign. The business server maintains a datastore including vendor data 800, campaigns 802, products 804, radio stations, login and security credentials, etc.

Continuing the example, the exercise equipment spot 816 may be scheduled to air on Monday, Wednesday and Friday at 4:05 a.m. and again at 3:45 p.m. on radio station KXLM 92.5 MHz in the Seattle, Wash. area. When this occurs, a user 822 who hears the ad and wants more information or can quu or "capture" the ad using any of the various means and methods described earlier. The user 822 may then contact the server 850 via any of various internet or telecom channels 890. For illustration, the user 822 is shown contacting the server via one or more of a mobile phone application ("QUUMOBILE"), portable remote capture unit ("QUUMOTE"), or a telecom voice channel ("QUUVOICE"). The server 850 may have a PSTN interface 870 to the wireless network 882, which the user reaches via 890. The server may have an interactive voice system 860 for use in connection with a voice connection, as well as a web interface 866 which is coupled to the Internet via an ISP 876.

In operation, when the server 850 receives capture data from the user or the user's capture device (or computer), it may access the business server 810 as needed to confirm identification of the product/campaign that corresponds to the received capture data. The (user) server 850 can then provide (download) additional content to the user. This may include, for example, additional audio, graphics, text files, video clips, etc. This additional content 830 may be stored on a datastore 832, managed by a server content manager 834 coupled to the server 850, or, in another embodiment, the content 830 is stored at the business server 810. For example, additional content associated with the advertisement of exercise equipment may include photos of the equipment, textual description of the equipment, video clips of the equipment in use by attractive models, etc.

In another embodiment, the user 822 who hears the exercise ad 816 on his radio receiver 820, for example while riding in a car, may obtain additional information in near-real time, i.e., without the use of a conventional computer. He can download additional content, such as the video, graphics or text files 830 via the server system 850 to his cell phone, Blackberry or other suitably equipped mobile device. To request that information, the user must first "capture" or identify the radio ad, which can be done in various ways as explained above. Then, the user may interact further with the server 850 via the telecom interface 860, which may employ interactive voice services, tone signaling, etc. This can be done on an ordinary voice channel. For example, if the user cell phone has no internet or other high-speed data connection, the user can simply request that additional audio information be played, or that information be sent to the user's email account later.

In another scenario, the user has internet access, and that channel is used to download additional content associated with the exercise equipment advertisement, such as a video clip, as noted above. The server can also receive and process the user's request to purchase the exercise equipment. More detail of the purchasing functions is disclosed above. The systems and methods illustrated in FIG. 8 provide great flexibility for the mobile user, and in some cases can be used to supplement, or even obviate, the web site portal interface to a server.

In a preferred embodiment, the business server system 810 implements a web site in which a station 814 can create a campaign for a product. In addition, any advertiser or retailer or radio station can login to system 810 once they have appropriate credentials. More specifically, in one embodiment, any retailer or radio broadcaster (or group) can request that a system administrator set up a new account on the system. All participating radio stations can view the product data. Thus, a participating radio station can log in, select an advertiser, select a product, and create a corresponding campaign 802. In general, a hierarchical arrangement of permissions preferably follows the following sequence: product, retailer, advertisers, radio station/group/.

Illustrative Commercial Implementation

In one presently preferred implementation, a system in accordance with various aspects of the present invention is described as follows. The user side server 850 may be implemented using Substruct. Substruct is an open source generic ecommerce tool than can be customized and extended. Substruct is developed on Ruby On Rails platform and uses MySQL database.

Substruct has basic ecommerce features as listed below:
1. Product Catalog
2. User Management
3. Role & Rights Management
4. Basic Content Management
5. Shipping Configuration
6. Payment gateways
7. FAQ Management
8. Shopping Cart
9. Wish list
10. Promotion management
11. Files Management As Substruct is an open source ecommerce tool, the complete tool including the source code and the database can be downloaded. The tool can be used as is if the above features are enough for an ecommerce website. Basic customizations like look and feel and additional shipping method, payment gateways, Roles, static web pages, etc can be configured and directly used in a production environment.

The business server 810 functionality Business Application (Business Division Management—BDM)—BDM is one of the MyQUU applications to Create and Manage the following business entities related to MyQUU:
1. Groups of Radio Stations/Sub-Groups of Radio Stations/ Radio Station (Subgroups is taken care in the next version of the document as we discussed)
2. Retailers
3. Advertisers
4. Products
5. Campaigns
6. Donations The application and database should support the following hierarchy—(Group of Radio Stations)->Radio Station->(Advertisers)->Retailers->

Products->Campaigns. Each of the above links supports one to many relationships. There are three user types—
   (1) Application Admin and
   (2) User belonging to one of the above groups.
   (3) Customers
Radio Station Groups (RSG):

Preferably, Radio Station groups can be created by an Application admin user. While creating an RSG, the admin user can create a new user and attach the user to the new RSG or hook one or more of the existing users to the new RSG. There can be more than one user for each RSG and each of the users can create new Radio Stations and new Radio Station users and assign existing users to Radio Stations.

Radio Stations sub-group (RSSG)

In one embodiment, RSSG can be created by an administrator or a RSG user. While creating an RSSG, the admin user or the RSG can create a new user and attach the user to the new RSSG or hook one or more of the existing users to the new RSSG. There can be more than one user for each RSSG and each of the users can create new Radio Stations and new Radio Station users and assign existing users to Radio Stations.

Radio Stations:

Radio Stations preferably can be created by an Application admin user, or an RSSG or RSG user. While creating a Radio Station, the admin user or the RSG user can create a new user and attach the user to the new Radio Station or hook one or more of the existing users under the respective RSG. The Radio Stations created by Admin user will have the flag. Radio stations are not visible to advertisers or retailers. Visibility is up only, not down the hierarchy. If created by admin, visible to the user only. If created by RSG, then visible to RSG users.

Advertisers:

Advertisers can be created by an Application admin user or a Radio Station user. When creating an advertiser, the admin user or the Radio Station user can create a new user and attach the user to the new Retailer or hook one or more of the existing users under the respective Radio Station. The Advertisers created by Admin user will have the flag "Admin_Created" set to true. The advertisers created by Admin user will be visible to any radio station. The advertiser created by a Radio Station user will be visible to the Radio station to which it belongs, unless the radio station gives visibility to other stations or subgroups belonging to the same group. In one embodiment, advertisers are not enabled to create campaigns. They can enter retailers or products only.

Retailers:

Retailers can be created by an Application admin user or a Radio Station user or an advertiser. While creating a Retailer, the admin user or the Radio Station user or the advertiser user can create a new user and attach the user to the new Retailer or hook one or more of the existing users under the respective Radio Station. The Retailers created by Admin user will have the flag "Admin_Created" set to true. The Retailers created by Admin user will be visible to all advertisers and radio stations. The Retailer created by a Radio Station user will be visible to the radio station to which it belongs to, unless the station user gives visibility to other stations or subgroups belonging to the same RSG. Preferably, all retailers irrespective of creation by admin or not will NOT be able to create campaigns. They can only create products. There can be more than one user per Retailer. Each of these users can create new Products/Campaigns. They will be able to view order reports and manage orders.

Products:

Products can be created by any user. If no retailer is attached to the product, products created by admin user will belong to the master retailer which will be named as MyQuu and also these products will have the Admin_Created flag set to true. These products will be available for all retailers to sell or create campaign. Products created by retailers will be visible only to the retailer created them. We support multiple users for each level. The products features can be developed by extending the existing Product catalog management feature of Substruct.

In one embodiment, the Products display page will have a search functionality and display on landing some default featured products. The logic to decide on the products to be decided on landing to be decided. When the customer is doing a search, in a side bar some related featured products can be display. When the customer is viewing a specific product detail, in the side bar, other products from the same retailer can be listed.

Campaign:

Campaigns preferably can be created by radio station users only. Campaigns cannot be created by admin user or by the retailers.

Users:

In the illustrative embodiment, there can be three type of users:

1. Application Admin
2. User belonging to one of RSG/RSSG/Radio Station/Advertiser/Retailer
3. Customers The Application admin will have access to all the features of the entire application. User belonging to a specific entity will have access only to the immediate child entity of that activity. Customers will be able to make orders from the products listed by various retailers or add products to their wishlist.

It will be obvious to those having skill in the art that many changes may be made to the details of the above-described embodiments without departing from the underlying principles of the invention. The scope of the present invention should, therefore, be determined only by the following claims.

The invention claimed is:

1. A computer program application stored in non-transitory machine-readable media for execution on a wireless telecommunication-enabled device, the application program including:
    a telecommunications module for effecting wireless communications via a wireless telecommunication network;
    a radio broadcast capture application module configured to receive a user command via an actuator configured for triggering the radio broadcast capture application module to capture and save data corresponding to a radio station, the captured data to identify the radio station and an item of interest promoted during a radio broadcast, wherein the user command includes an actuator identifier indicating a user selection of a request for supplemental content, the supplemental content associated with the item of interest;
    wherein the radio broadcast capture module is further configured to generate the request for supplemental content, the request including the captured data, a device identifier and an actuator identifier; and
    a module for transmitting the request to a remote server associated with the radio station.

2. The computer program application according to claim 1 wherein the actuator is a soft key or a button.

3. The computer program application according to claim 1, further comprising a receiving module for receiving supplemental content responsive to the request for supplemental content.

4. The computer program application according to claim 1 wherein the radio broadcast capture module captures a time and radio frequency of the radio broadcast and wherein the transmitting module sends the captured data over a messaging service of the wireless telecommunication network.

5. The computer program application according to claim 1, further comprising associating the radio station and the item of interest in a memory module.

6. The computer program application according to claim 1, wherein the item of interest is a media file, a song, a product, an invitation to donate money, a vote request or a program transcript, or combination thereof.

7. A method for delivery of supplemental content associated with a broadcast radio advertisement comprising:
preparing an audio advertisement for sale of an item;
broadcasting the audio advertisement over a radio station;
receiving a request for the supplemental content wherein the supplemental content includes digital content associated with the audio advertisement and communicated separately from the audio advertisement;
wherein the request includes data identifying the audio advertisement, a device identifier and an actuator identifier, wherein the actuator identifier indicates a user selection for requesting the supplemental content;
associating the identified audio advertisement with the supplemental content; and
delivering the supplemental content to a device identified by the device identifier in response to receiving the actuator identifier.

8. The method according to claim 7 wherein the data identifying the supplemental content includes a radio station identifier and a time of said broadcasting the audio advertisement to identify supplemental content associated with the audio advertisement.

9. The method according to claim 8 wherein the supplemental content associated with the identified audio advertisement comprises at least one of a text file, a graphic file and a video file for providing additional information associated with the audio advertisement and wherein the delivering the supplemental content includes delivering the supplemental content to a cell phone identified by the device identifier.

10. The method according to claim 9 including:
providing an automated server having access to the supplemental content associated with the audio advertisement; and
implementing a telecommunications interface for accessing the automated server via a telecommunications network;
wherein the request for supplemental content is received by the server via the telecommunications network.

11. The method according to claim 10 wherein:
said delivering the supplemental content to the device identified by the device identifier includes delivering the supplemental content via the Internet.

12. The method according to claim 10 wherein:
the request for supplemental content is transmitted to the server from a user cell phone over a voice channel service, and the supplemental content is delivered to the user via the voice channel service.

13. The method according to claim 10 wherein:
the request for supplemental content is transmitted to the server from a user cell phone over a data channel service, and the supplemental content is delivered to the user via the data channel service.

* * * * *